United States Patent

[11] 3,581,053

| [72] | Inventor | August F. Manz |
| | | Union, N.J. |
| [21] | Appl. No. | 688,157 |
| [22] | Filed | Dec. 5, 1967 |
| [45] | Patented | May 25, 1971 |
| [73] | Assignee | Union Carbide Corporation |

[54] SYNCHRO-ARC METAL TRANSFER
7 Claims, 6 Drawing Figs.

[52] U.S. Cl. .................................................. 219/137,
219/130, 219/131
[51] Int. Cl. ................................................... B23k 9/00
[50] Field of Search .......................................... 219/130,
131, 137, 135; 314/68

[56] References Cited
UNITED STATES PATENTS
1,984,809  12/1934  Re Qua ........................... 219/130

| 3,350,538 | 10/1967 | Johnson ........................ | 219/137 |
| 3,365,564 | 1/1968 | Boughton ..................... | 219/137X |
| 3,053,975 | 9/1962 | Nelson et al. ................. | 219/130 |
| 3,277,266 | 10/1966 | Blaszkowski ................ | 219/76 |
| 3,361,892 | 1/1968 | Spencer ....................... | 219/131 |

*Primary Examiner*—Joseph V. Truhe
*Assistant Examiner*—C. L. Albritton
*Attorneys*—Paul A. Rose, Thomas I. O'Brien, Dominic J. Terminello and Eugene Lieberstein

ABSTRACT: Electric arc working apparatus and process for controllably transferring metal from a consumable electrode to a workpiece by applying recurrent power pulses to said electrode while oscillating said electrode at a multiple frequency relative to the power pulse recurrence frequency, and selectively displacing the phase between said power pulses and said electrode oscillations.

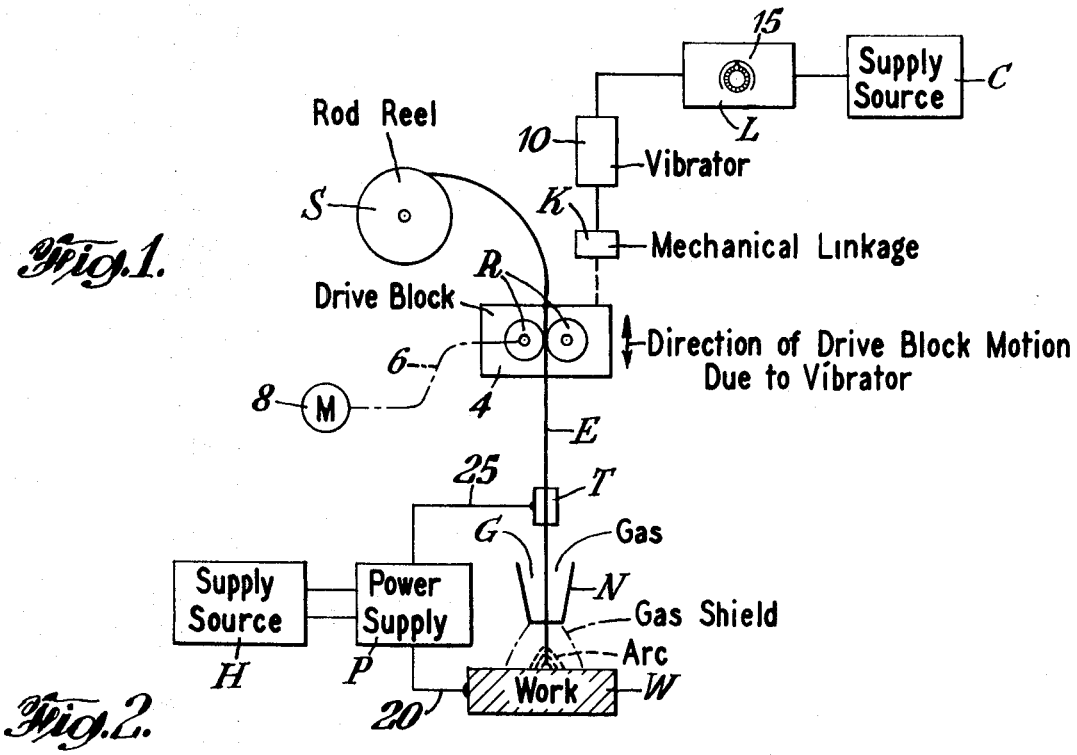
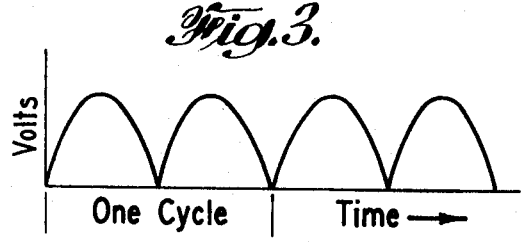
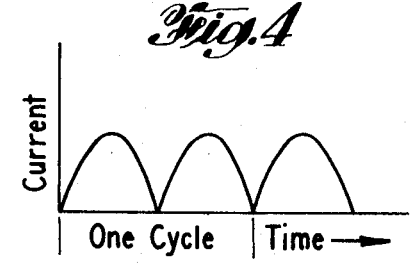
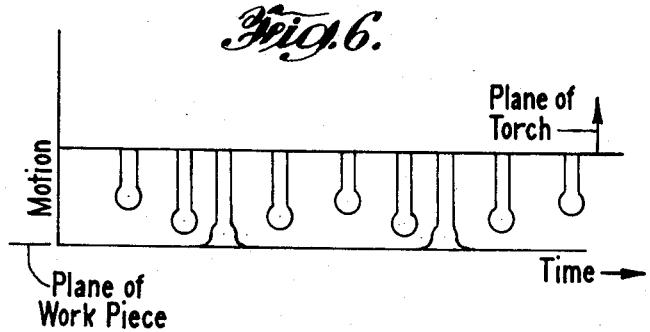
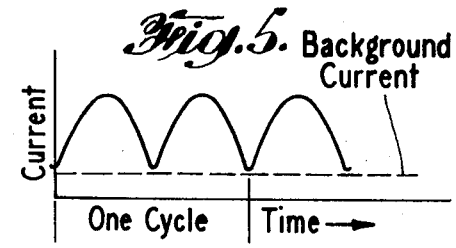

SYNCHRO-ARC METAL TRANSFER

This invention relates to a method and apparatus for electric arc working wherein metal transfer is electromechanically induced and more particularly to such a method wherein the metal transfer cycle is controlled.

BACKGROUND

One of the most useful of the many arc-welding processes is the short circuit metal transfer process. In such a process, metal is transferred to the work when contact is made between the electrode and work, by gravity, surface tension and electromagnetic pinch force. Pinch force is characterized by a squeezing action separating the globule of molten metal from the wire electrode. The short circuit technique is characterized by its short arc length and low heat input which permits the operator to get in close to the work for doing out of position welding. Welds produced by this technique are generally of high quality and require little post weld cleaning.

Although advantageous, the process has several important deficiencies. One of the major detriments is the formation of spatter which is considered by the art to be inherent in the short circuit process. Spatter is the result of the electromagnetic pinch force acting on the liquid metal bridge formed between the electrode tip and molten puddle during the short circuit interval.

Another shortcoming in the short circuit metal transfer process is the lack of uniformity of the metal transfer droplets. To improve uniformity in the weld quality would require the size of each molten drop, in each transfer cycle to be equivalent. Since the frequency of metal transfer in the short circuit transfer process varies over a wide range, the molten drops transferred to the weld puddle vary in size. This is also believed attributable to the electromagnetic pinch force which varies from instant to instant.

In addition, the short circuit metal transfer process, as practiced today, has other practical limitations because the power supplied to the weld is characteristically low. When the energy input is increased, unstable metal transfer may result.

SUMMARY OF THE INVENTION

All of the limitations referred to above can be partially or totally overcome by minimizing or eliminating the electromagnetic pinch force. In accordance with the present invention the short circuit metal transfer process may be practiced without developing the electromagnetic pinch force deemed heretofore inherent in the process. Without the effect of electromagnetic pinch force, true short circuit metal transfer without spatter may theoretically be accomplished.

It is known that metal may be transferred during a short circuit interval entirely by electromechanical inducement wherein the electrode is pulsated with respect to the workpiece. Intermittent short circuit metal transfer caused by vibrating an electrode is well documented in Russian literature, the technique being commonly referred to in the art as "Vibroarc."

It has been discovered in accordance with the present invention that if the power supplied to the system is reduced during the instant of a mechanically induced short circuit, spatter will be minimized. Moreover, by varying the phase relationship between the supplied power, when it is introduced in the form of pulses, and the pulsating electrode, substantial control is provided over the arc system. For purposes of this invention disclosure the term "pulse" is intended to include sinusoidally derived waveforms as well as waveforms such as sawtooth, square etc.

OBJECTS

It is, accordingly, the primary object of this invention to selectively control the phase relationship between the power pulses and electrode feed pulses to cause metal transfer to occur at any desired current level, thereby effecting control of spatter, puddle fluidity, penetration and arc forces.

It is a further object of this invention to provide a method and apparatus for electromechanically producing metal transfer from a consumable electrode to a workpiece, with minimum or zero spatter.

It is another object of this invention to provide a method and apparatus for welding with a series of continuous power pulses while the electrode is being similarly pulsated with respect to the workpiece for controlling the transfer of metal to the work at a predetermined frequency.

THE DRAWINGS

A full and complete description of this invention follows with reference to the attached drawings in which:

FIG. 1 is a circuit diagram illustrating typical apparatus for practicing the invention;

FIG. 2 is a schematic circuit diagram of the power supply of FIG. 1.

FIG. 3 shows a typical wave shape of the open circuit voltage output for the power supply schematically shown in FIG. 2.

FIG. 4 shows a typical wave shape of the pulsated current output of the power supply when drawn through a load with the series inductor adjusted for minumum value.

FIG. 5 is a second typical wave shape of the pulsated current output with the series inductor adjusted to an intermediate value.

FIG. 6 is a pictorial representation of the position of the electrode tip of FIG. 1 with respect to the workpiece as the electrode is fed in pulse synchronization with the current.

DESCRIPTION

As shown in FIG. 1 a consumable wire electrode E is drawn from a supply reel S by feed rolls R which is driven by motor 8 by means of flexible shaft 6. The feed rolls R are contained within and secured to drive block 4 which is mechanically linked through coupling unit K to vibrator assembly 10. Vibrator assembly 10 is shown connected through phase shift network L to a 60-cycle supply source C. The mechanical coupling unit K between the vibrator 10 and drive block 4 is selected for illustrative purposes as providing a 1:2 ratio. Thus, vibrator 10 when energized from the 60-cycle source C will vibrate or oscillate drive block 4 at 120 cycles per second. The feed rolls R direct electrode E through contact guide tube T to the workpiece W. Electrode E is driven continuously at a constant rate of speed as determined by the desired melt-off rate while simultaneously being vibrated in a vertical plane passing through the workpiece at 120 cycles per second. The flexible drive shaft 6 permits the motor 8 to remain stationary while the drive block 4 is vibrating.

Contact guide tube T is connected by lead 25 to one terminal of the electrical power supply P. The other terminal of power supply P is connected by lead 20 to the workpiece W. An arc is initiated by mechanically lowering electrode E into direct contact with the workpiece W. Alternative means may be used to initiate an arc such as auxiliary high frequency means. A nozzle N surrounds the contact guide tube T and electrode E, through which a suitable shielding gas G is passed to shield the arc from the atmosphere. The power supply P is connected for illustrative purposes to a 460-volt single-phase 60-cycle supply H. The 60-cycle supply H of power supply P is generated from the same line as the 60-cycle supply source C connected through phase shift network L to the vibrator assembly 10. Accordingly, the two 60-cycle sources C and H are in natural synchronization with respect to one another.

A detailed block diagram of the power supply P is shown in FIG. 2. An adjustable transformer 14 is connected through leads 16 and 18 to the input 460-volt single-phase 60-cycle supply H. Sliding brush 12 of adjustable transformer 14 is connected to conductor lead 22. Full-wave rectifier 26 is coupled to the output of adjustable transformer 14 through conductor leads 22 and 24. The output of the full-wave rectifier is shown in FIG. 3 as a wave train of recurrent half-cycle positive pulses. The output amplitude of the pulses shown in FIG. 5 may be adjusted by varying sliding brush 12 of adjustable transformer 14. Variable inductor 28 is shown connected in series with output lead 30 of full-wave rectifier 26. The inductor 28 is selectively varied through wiper arm 34. Wiper arm 34 is connected to output lead 25 of power supply P. Variable inductor 28 represents a filter choke. Adjustment of wiper arm 34 to the minimum inductor setting will result in an output current waveform as shown in FIG. 4. Adjustment of wiper arm 34 toward the opposite extreme of inductor 28 will generate an output current waveform on lead 25 as shown in FIG. 5. The current waveform of FIG. 5 possesses a minimum value of DC background current. The magnitude of the minimum or background current decreases as wiper arm 34 is moved from the maximum inductor setting toward the minimum setting.

To produce true spatterless short circuit metal transfer the pulsating electrode must break contact with the workpiece at an instant of zero pulse power. This is accomplished by varying wiper arm 34 to the minimum inductance setting of inductor 28. Accordingly, the output current of power supply P will be represented as shown in FIG. 4. With the vibrating assembly 10 in natural synchronism and proper phase with the power supply P, electrode E will break contact with the work W at instances of zero current. Metal is transferred to the weld puddle at the occurrence of the short circuit by surface tension without the assistance of electromagnetic forces. Such metal transfer is therefore accomplished without spatter. An arc may be reestablished between the electrode E and work W by the open circuit voltage during the mechanical retraction of electrode E or by separate arc starting means such as, for example, high frequency. Power supply P produces 120 pulses per second through the rectification of the 60-cycle input supply while vibrator 10 cyclically reciprocates electrode E at 120 cycles per second resulting in a short circuit frequency of 120 shorts per second.

A pictorial representation of the electrode tip as it advances toward and recedes from the work W is shown in FIG. 6. The maximum and minimum points of the current waveform coincides with the position of the tip of the electrode. With the electrode tip at its uppermost point from the work W, the current input is at maximum, allowing a globule of metal to form at the end of the electrode. With the tip of the electrode in direct contact with the work W, the current is at a minimum value. The globule formed at the end of the electrode is detached therefrom by the surface tension force which exists between the molten globule and weld puddle. Hence, the short circuit frequency is precisely equal to the number of shorts occurring per second.

Although 60-cycle supply sources have been shown for purposes of illustration, the invention is not to be construed as limited thereto. Accordingly, the supply sources can be of any frequency necessary to achieve the desired short circuit frequency. Alternatively, a supply source of given frequency may be employed and the desired short circuit frequency achieved through means such as frequency multiplying and/or divider circuitry. The only requirement in the system is that the two supplies be synchronized to one another. Although natural synchronization is preferred, the two sources may be synchronized by other known conventional techniques. In addition, the frequency of the current pulses may be a multiple or submultiple of the frequency of electrode oscillation.

The heat generated by the arc is a function of the arc length and the input power. Generated arc power determines to a substantial degree such variables as arc force, depth of penetration, puddle fluidity, spatter, etc. With the system adjusted for theoretically true spatterless welding, the heat generated by the arc for a given open circuit voltage is maximum since both the current and arc length are in phase and reach their maximum level simultaneously. By the selective adjustment of control knob 15 of phase shift network L shown in FIG. 1, the heat distribution within a transfer cycle may be controllably varied. For example, the phase shift network when varied to establish a complete out of phase relationship between the current input pulses and the pulsed or vibrating electrode will reduce the heat generated by the arc to a minimum. A phase difference selected between the in phase and out of phase extremes will provide a range of arc heat intensities from which a selection may be made by a welding operator to effectively control any of the aforementioned variables depending upon the particular welding operation at hand.

Alternatively, the amplitude of the electrode oscillation i.e. the electrode swing may be selectively adjusted to increase or decrease the operating arc length. A greater arc length will permit higher arc heat generation. Increasing the generated arc heat in this manner is instrumental in increasing the deposition rate provided, of course, an accompanying increase is introduced in the average electrode feed rate. An increase in arc heat may also be achieved by increasing the magnitude of the open circuit voltage of power supply P. This is accomplished as hereinbefore mentioned by adjusting sliding brush 12 of autotransformer 14 of power supply P. Control of the rate of wire melting can thus be accomplished while maintaining the short circuit mode of metal transfer.

Moreover, the average input current may be raised by increasing the inductance of power supply P through variable inductor 28. An increase in inductance raises the minimum DC background current as shown in FIG. 5. In addition, by providing background current auxiliary starting means to reignite the arc may be eliminated.

Although the hereinabove discussion of the invention has been devoted to "short circuit transfer" the principles underlying the invention can be employed as well to "spray transfer." Spray transfer is characterized by the continuous formation of minute droplets of molten metal at the tip of the electrode which are projected with great force in line with the electrode to the workpiece. To establish spray transfer the welding current must be raised above a critical level known as the transition level. This is accomplished with a high magnitude direct current yielding a continuous spray.

In accordance with the principles of the present invention spray transfer may be achieved with current densities lower than that required heretofore. This is rendered possible as a result of the unique control provided by vibrating the electrode at a rate in synchronism with a pulsating input current. As stated hereinbefore, the heat generated in the arc is increased with an increase in the arc length. Hence, by adjusting the amplitude of the electrode oscillation such that the arc length is substantially increased at an instant of maximum or peak current, spray transfer will occur provided the magnitude of the peak is sufficiently high. During the remainder of the cycle there will be insufficient energy to effect any metal transfer. Furthermore, the energy input to the work during the periods between metal transfer will be substantially minimized by the combined effect of the reduced current and reduced arc length.

While the invention has been described in connection with the specific apparatus shown and described, it is apparent that the apparatus may be modified by those skilled in the art for accomplishing that taught within the scope of the present invention. It is, therefore, intended that the appended claims cover all such modifications which fall within the spirit and scope of the present invention.

What I claim is:

1. A process for electric arc working wherein an arc is established between a consumable electrode and a workpiece comprising the steps of: advancing the tip of said consumable electrode while oscillating said electrode in a substantially perpendicular plane with respect to said workpiece such that the arc length is repetitively varied between a minimum and maximum amplitude; simultaneously supplying power to said electrode in the form of recurrent power pulses at an integer multiple frequency with respect to said electrode oscillations; and selectively displacing the phase between said recurrent power pulses and said electrode oscillations whereby the instantaneous power provided by the recurrent power pulses at the instant of minimum arc length is determined by the amount of said phase displacement.

2. A process as defined in claim 1 wherein the amplitude of said recurrent power pulses is selectively adjustable.

3. A process as defined in claim 1 wherein the amplitude of electrode oscillation is selectively adjustable.

4. A process for electric arc working comprising: supplying recurrent pulses of current having a minimum and maximum amplitude through a consumable electrode being advanced toward a workpiece; raising said electrode to a height above said workpiece to permit molten metal to be formed at the end of the electrode; lowering said electrode into direct contact with said workpiece for depositing said molten metal upon said workpiece, and selectively displacing the phase between the recurrent arc pulses of current and the raising and lowering of said electrode whereby the instantaneous amplitude of said arc pulses of current at the instant the electrode contacts said workpiece is determined by the amount of said phase displacement.

5. A method of electric arc working wherein metal is transferred during short circuits between a consumable electrode and a workpiece which comprises: feeding said electrode toward said workpiece while simultaneously oscillating said electrode in a substantially perpendicular plane with respect to the workpiece to cause intermittent short circuits between the electrode and workpiece at a predetermined short circuit frequency; supplying recurrent pulses of current, having a minimum and maximum amplitude, to said electrode at an integer multiple frequency with respect to said short circuit frequency; and establishing a phase displacement between the recurrent pulses of current and the oscillating electrode such that the electrode breaks contact with the workpiece at substantially the instant of minimum-amplitude current.

6. An arc-welding system comprising in combination with a welding circuit including means for feeding a consumable electrode toward a workpiece; means for oscillating said electrode at a given frequency in a substantially perpendicular plane with respect to said workpiece such that the arc length is repetitively varied between a minimum and maximum amplitude; power supply means electrically connected in said welding circuit for supplying to said electrode periodic pulses of current at an integer multiple frequency with respect to said electrode oscillating frequency; and phase shift means for selectively displacing the phase between said pulses of current and said oscillating electrode thereby to establish any desired intersection of instantaneous current amplitude and arc length.

7. Arc welding apparatus as defined in claim 6 wherein said power supply includes means for selectively adjusting the magnitude of said pulses of direct current and means for introducing into said welding circuit a predetermined amount of direct current in addition to said pulses of current.